May 27, 1924.
J. CASTELLANO
1,495,671
SAFETY CAP FOR WATER TRAPS FOR GAS PIPES
Filed April 7, 1923
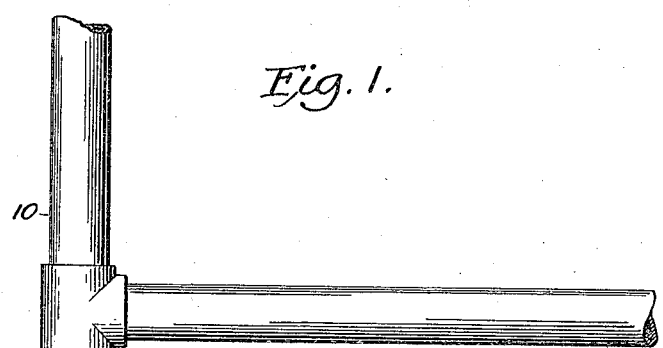
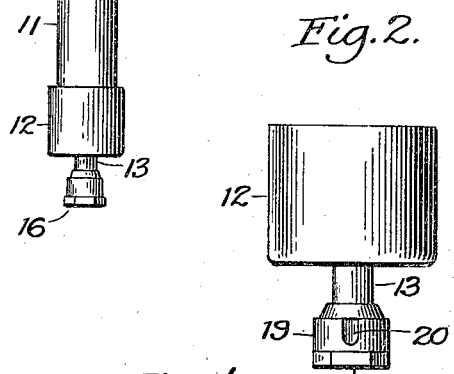
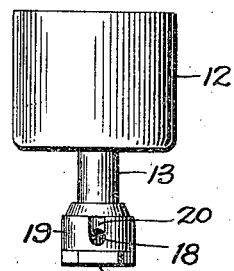
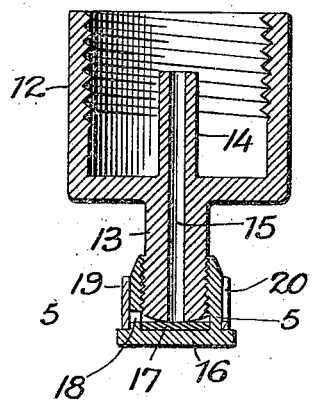
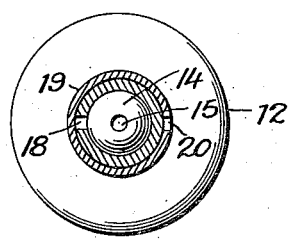
INVENTOR.
James Castellano,
BY James P. Duhamel,
ATTORNEY.

Patented May 27, 1924.

1,495,671

UNITED STATES PATENT OFFICE.

JAMES CASTELLANO, OF BROOKLYN, NEW YORK.

SAFETY CAP FOR WATER TRAPS FOR GAS PIPES.

Application filed April 7, 1923. Serial No. 630,560.

*To all whom it may concern:*

Be it known that I, JAMES CASTELLANO, a resident of Brooklyn, Kings County, New York, and a citizen of the United States, have invented certain new and useful Improvements in Safety Caps for Water Traps for Gas Pipes, of which the following is a specification.

This invention relates to moisture traps for pipes and particularly for gas pipes where the fluid is charged with a liquid that condenses under certain conditions causing the accumulation of water at the lowest level of the piping and stopping the flow of gas or retarding the same.

The object of the invention is to locate a receptacle at the lower end of the upright pipe of a gas distributing system and provide the said receptacle with a vent that is closed by a cap and rotating collar and by which the said system may be drained and the liquid blown out by the gas, after which the vent may be closed.

These and other objects and details of the invention are more fully described in the following specification, set forth in the appended claims and illustrated in the accompanying drawings, wherein:

Figure 1 is a view of a part of a gas distributing system showing the location of the improved trap.

Fig. 2 is a side elevation of the device closed.

Fig. 3 is a similar view with the vent opened.

Fig. 4 is an enlarged vertical sectional view.

Fig. 5 is a section on the line 5—5 of Fig. 4, looking upward.

In draining pipes used for gas distribution it is necessary to open some of the sections or remove a cap that not only releases the liquid but a large volume of gas, besides requiring the services of a plumber.

The question of responsibility also frequently arises and the liability of the gas company and the user is disputed as to who should be charged for the plumber's work.

By applying the present invention to the lowest point of a gas distributing system any defect therein by the accumulation of water in the pipes may be remedied without the assistance of an expert, or tests may be made to locate the trouble and determine if the same is in the meter or the pipes only.

As will be seen in Fig. 1 the vertical drip pipe 10 is a part of a gas supply system and its lower end 11 extends below any of the horizontal pipes.

At the extremity of the part 11 is secured the cup 12 having internal screw threads for attachment to the pipe and a downwardly extending nipple 13. Within the cup is an extension 14 to the nipple and a passage 15 through the two affords an outlet from the pipe system when the cap 16 at the lower end of the nipple is unscrewed, but not removed.

The cap 16 is provided with a soft metal disc 17 within its head to cover the end of the outlet 15 and secure a perfect closure while a perforation 18 in the side of the cap permits of the immediate release of any liquid that may be in the pipe 10 or the cup 12.

If when the cap is loosened there should be no water present, a flow of gas would start as soon as the cap were loosened, and through the perforation 18, and continue while the whole of the perforation was being exposed, so that in order to provide for instant investigation and to prevent the lengthy release of the gas a collar 19 is fitted closely about the cap and adapted to rotate around the same.

A slot or opening 20 in the collar is adapted at one state of its rotation to register with the perforation 18 and uncover the whole opening to drain the pipes if any water exists. If no water flows from the cup and only gas escapes, the sleeve is immediately turned, closing the openings and the cap screwed back into place closing the outlet 15.

When, on opening the outlet and registering the slot 20 with the perforation 18, water flows, the parts are left open until the pipe is drained and gas alone flows, when the sleeve is rotated and the cap screwed down on the nipple.

The extension 14 permits the draining off of the water and the collection in the cup of any dirt that might stop up the openings.

It is obvious that the cup and its parts may be otherwise modified and altered without departing from the essential features above described or from the scope of the appended claims.

On occasions when liquid in gas pipes of a house or apartment retards the flow of the gas and causes the burning jet to flicker or fluctuate a tyro may remove the obstruction as above described and restore the gas distributing system to its normal condition.

What I claim as new is:

1. In a water trap for gas pipes, the combination of a gas pipe, a cup at the lower end of the pipe, a nipple on the cup and having an outlet, a cap adapted to close the outlet and having a perforation and a closure for said perforation.

2. In a water trap for gas pipes, the combination of a gas pipe, a cup on the lower end of the pipe and having a nipple with an outlet, a cap adapted to be screwed upon the nipple to close the outlet and having a perforation to permit the passage of fluid when the outlet is opened, and means for closing the perforation.

3. In a water trap for gas pipes, the combination of a vertical gas pipe, a cup adapted to be attached to the lower end of the pipe, a nipple having an outlet passage, a cap adapted to be screwed on the nipple to close the outlet and having a lateral perforation, and means on the cap for closing the perforation.

4. In a water trap for gas pipes, the combination of a vertical gas pipe, a cup adapted to be attached to the lower end of the same, a depending nipple at the bottom of the cup and an upward extension within the cup, an outlet passage extending through said nipple and extension, a cap adapted to screw on the nipple and having a lateral opening, and a sleeve with a slot on the cap and adapted to expose or close the opening.

In testimony whereof I hereunto affix my signature.

JAMES CASTELLANO.